United States Patent [19]

Atkinson et al.

[11] 3,966,481

[45] June 29, 1976

[54] FIBERIZABLE ALKALI-RESISTANT E-TYPE GLASS

[75] Inventors: Alan W. Atkinson; Brian P. Hodgson, both of Rochdale, England

[73] Assignee: Turner & Newall Limited, Manchester, England

[22] Filed: June 30, 1975

[21] Appl. No.: 592,034

Related U.S. Application Data

[63] Continuation of Ser. No. 450,231, March 11, 1974, abandoned.

[30] Foreign Application Priority Data

Mar. 12, 1973 United Kingdom............... 11783/73

[52] U.S. Cl..................................... 106/54; 106/50; 106/99
[51] Int. Cl.²..................... C03C 3/08; C03C 13/00
[58] Field of Search.......................... 106/54, 99, 50

[56] References Cited
UNITED STATES PATENTS

| 3,095,311 | 6/1963 | von Wranau et al. ................ 106/50 |
| 3,413,133 | 11/1968 | Stalego ................................ 106/50 |
| 3,673,049 | 6/1962 | Giffen et al. ......................... 106/54 |
| 3,736,162 | 5/1973 | Chvalovsky et al. ................. 106/50 |
| 3,783,092 | 1/1974 | Majumdar............................. 106/50 |
| 3,904,423 | 9/1975 | Guthrie................................. 106/50 |

FOREIGN PATENTS OR APPLICATIONS 124,553 6/1939 Australia.............................. 106/50

*Primary Examiner*—Helen M. McCarthy
*Attorney, Agent, or Firm*—Cushman, Darby & Cushman

[57] ABSTRACT

Glass compositions consisting essentially of an E-glass are modified by incorporation therein of zirconia or of zirconia and titania, preferably in a total amount not exceeding 12%, more preferably not exceeding 8%, by weight of the composition, whereby significant improvement in alkali resistance is achieved.

6 Claims, No Drawings

FIBERIZABLE ALKALI-RESISTANT E-TYPE GLASS

This application is a continuation of our earlier application Ser. No. 450,231 filed Mar. 11, 1974, now abandoned.

This invention concerns improvements in or relating to glass compositions and fibres made therefrom.

Attempts to use E-glass as a reinforcement in cementitious products in the building industry have been essentially unsuccessful, since the high alkalinity of the hydrated cement matrix degrades the fibres and the advantages of reinforcing with such fibres therefore markedly diminishes with time.

An object of the present invention is to obviate or mitigate the above disadvantages.

The present invention provides a glass composition consisting of an E-glass modified with additions of zirconia or zirconia and titania in proportions such as to impart improved alkali resistance (i.e. improved over that exhibited by unmodified E-glass) but below such proportions at which crystal nucleation interferes with a melt drawing process.

It is a matter of simple experimental test to determine the concentration of titania and/or zirconia at which crystal nucleation occurs.

The proportion of titania added preferably is within the range from 1 to 6% by weight of the total glass composition; the proportion of zirconia added preferably is within the range from 2 to 6% by weight of the total glass composition; and the total weight of titania and zirconia added to the composition preferably does not exceed 8% by weight of the total glass composition.

Less preferably, because devitrification may occur at the higher proportions, the $TiO_2$ may be present in an amount up to 8% by weight and the $TiO_2$ and $ZrO_2$ together may be present in an amount up to 12% by weight of the composition.

Glass according to the invention may thus consist essentially of:

| | |
|---|---|
| $SiO_2$ | 46 to 56% (by weight) |
| $B_2O_3$ | 6 to 12% |
| $R_2O_3$ | 12 to 17% ($Fe_2O_3$ less than 1%) |
| CaO | 13 to 24% |
| MgO | 0 to 6% |
| F | 0 to 1% |
| $R_2O$ | less than 1% |
| $ZrO_2$ | 2 to 6% |
| $TiO_2$ | 0 to 6% |

$R_2O_3$ is $Al_2O_3$ and $Fe_2O_3$ with minor amounts of similar oxides, and $R_2O$ is $Li_2O$, $Na_2O$ or $K_2O$ or a mixture of at least two thereof; $R_2O$ is usually present, if at all, as impurity, as is F. The total percentage of CaO plus MgO should not exceed 25%.

The zirconia can be added in the form of zircon (zirconium silicate).

It is found that glasses according to this invention possess good melt drawing properties as a result of the presence of the minor components in E-glass, such as boric oxide, which are responsible for the good melt drawing properties of E-glass, so that the efficiency of the melt drawing apparatus (when used for compositions according to this invention) is far superior to that obtained from simple glasses.

Preferred embodiments of the present invention will now be described, for the purposes of illustration, in the following Examples.

EXAMPLE 1

A glass of the following composition was made and was melt drawn at 1210°C, percentages being by weight of the total composition:

| | | |
|---|---|---|
| Silica | 48.70% | |
| Alumina | 13.25% | |
| Calcium Oxide | 15.50% | Typical E-glass |
| Magnesium Oxide | 4.80% | |
| Boric Oxide | 9.75% | |
| Titania | 4.0% | |
| Zirconia | 4.0% | |

The fibres obtained exhibited a tensile strength of 0.91 GPa (GPa = $GN/m^2$) after treatment in boiling saturated calcium hydroxide, followed by washes in distilled water, 1% HCl acid for one minute, water and acetone and final drying.

The fibres retained approximately 65% of the original strength, whereas the unmodified E-glass retained only approximately 35% of its original strength after the same treatment.

EXAMPLE 2

Fibres were produced, as in Example 1, with the following composition:

| | | |
|---|---|---|
| $SiO_2$ | 52.3% | |
| $B_2O_3$ | 7.3% | Typical E-Glass |
| $Al_2O_3$ | 13.3% | |
| $Fe_2O_3$ | 0.4% | |
| CaO | 18.2% | |
| MgO | 3.6% | |
| $Na_2O$ | 0.2% | Typical E-glass |
| $K_2O$ | 0.7% | |
| $ZrO_2$ | 4.0% | |

Before the alkali treatment the strengths of the unmodified (no zirconia) E-glass and the $ZrO_2$-modified E-glass were 0.93 GPa and 1.15 Pa respectively, whereas after alkali-treatment, the strengths were 0.36 and 0.65 respectively, showing strength retention of about 35% for the unmodified E-glass as against about 56% for the modified composition.

EXAMPLE 3

Fibres were produced, as in Example 1, with the following composition:

| | | |
|---|---|---|
| $SiO_2$ | 51.3% | |
| $B_2O_3$ | 7.0% | |
| $Al_2O_3$ | 13.0% | Same E-glass as in Example 2 |
| $Fe_2O_3$ | 0.4% | |
| CaO | 17.9% | |
| MgO | 3.5% | |
| $Na_2O$ | 0.2% | |
| $K_2O$ | 0.7% | |
| $ZrO_2$ | 6.0% | |

After alkali treatment, this glass had a strength of 0.62 GPa, or a strength retention of about 54%.

It can be seen that the degree of alkali resistance may thus be varied and improved by adjusting the proportions of titania and zirconia within the ranges specified above.

We claim:

1. A fiberizable glass composition exhibiting improved alkali resistance consisting essentially, by weight, of

| | |
|---|---|
| $SiO_2$ | 46 to 56% |
| $B_2O_3$ | 7 to 12% |
| $R_2O_3$ | 12 to 17% ($Fe_2O_3$ less than 1%) |
| CaO | 13 to 24% |
| MgO | 0 to 6% |
| F | 0 to 1% |
| $R_2O$ | less than 1% |
| $ZrO_2$ | 2 to 6% |
| $TiO_2$ | 0 to 6% | wherein $R_2O_3$ is $Al_2O_3$ with less than 1% $Fe_2O_3$ and minor amounts of similar oxides, and $R_2O$ is $Li_2O$, $Na_2O$, $K_2O$ or a mixture of at least two thereof, said glass composition having improved alkali resistance compared to a similar composition absent titania and zirconia, wherein CaO plus MgO does not exceed 25%, and $ZrO_2$ plus $TiO_2$ does not exceed 8%.

2. A glass composition according to claim 1, consisting essentially of:

| | |
|---|---|
| SiO | 48.70% |
| $Al_2O_3$ | 13.25% |
| CaO | 15.50% |
| MgO | 4.80% |
| $B_2O_3$ | 9.75% |
| $TiO_2$ | 4.00% |
| $ZrO_2$ | 4.00%. |

3. A glass composition according to claim 1, consisting essentially of:

| | |
|---|---|
| $SiO_2$ | 52.3% |
| $B_2O_3$ | 7.3% |
| $Al_2O_3$ | 13.3% |
| $Fe_2O_3$ | 0.4% |
| CaO | 18.2% |
| MgO | 3.6% |
| $Na_2O$ | 0.2% |
| $K_2O$ | 0.7% |
| $ZrO_2$ | 4.0%. |

4. A glass composition according to claim 1 consisting essentially of:

| | |
|---|---|
| $SiO_2$ | 51.3% |
| $B_2O_3$ | 7.0% |
| $Al_2O_3$ | 13.0% |
| $Fe_2O_3$ | 0.4% |
| CaO | 17.9% |
| MgO | 3.5% |
| $Na_2O$ | 0.2% |
| $K_2O$ | 0.7% |
| $ZrO_2$ | 6.0%. |

5. A process for improving the alkali resistance of a fiberizable glass composition consisting essentially of:

| | |
|---|---|
| $SiO_2$ | 46 to 56% |
| $B_2O_3$ | 7 to 12% |
| $R_2O_3$ | 12 to 17% ($Fe_2O_3$ less than 1%) |
| CaO | 13 to 24% |
| MgO | 0 to 6% |
| F | 0 to 1% |
| $R_2O$ | less than 1% | comprising adding to said glass composition from 2 to 6% $ZrO_2$ and optionally from 0 to 6% $TiO_2$, the percentages being by weight of the final composition, wherein $R_2O_3$ is $Al_2O_3$ with less than 1% $Fe_2O_3$ and minor amounts of similar oxides, and $R_2O$ is $Li_2O$, $Na_2O$, $K_2O$ or a mixture of at least two thereof, the resulting glass composition exhibiting improved alkali resistance compared to a similar composition absent the titania and/or zirconia, wherein CaO plus MgO does not exceed 25%, and $ZrO_2$ plus $TiO_2$ does not exceed 8%.

6. The process of claim 5 wherein during the addition the $B_2O_3$ content of the product is maintained at 7% or more and the $R_2O$ content is maintained below 1%.

* * * * *